United States Patent [19]
Belisle

[11] Patent Number: 6,017,076
[45] Date of Patent: Jan. 25, 2000

[54] FAIRING AND FAIRINGLESS ENCLOSURES FOR TWO-, THREE-, AND FOUR-WHEEL AUTOMOTIVE VEHICLES/RIDERS/ PASSENGERS/LOADS (FFE)

[76] Inventor: William Redvers Belisle, 1401 Boxwood Dr. Apt. C, Madison County, Ala. 35816

[21] Appl. No.: 08/896,369

[22] Filed: Jul. 18, 1997

[51] Int. Cl.[7] .................................................... B62J 17/00
[52] U.S. Cl. ................... 296/78.1; 280/728.1; 280/728.2
[58] Field of Search ........................ 296/78.1; 280/728.1, 280/728.2

[56] References Cited

U.S. PATENT DOCUMENTS

| | | | |
|---|---|---|---|
| 1,135,337 | 4/1915 | Bunau-Varilla | 296/78.1 |
| 3,979,147 | 9/1976 | Kelley | 296/78.1 |
| 5,685,388 | 11/1997 | Bothwell et al. | 296/78.1 |

Primary Examiner—Gary C. Hoge

[57] ABSTRACT

An airbag and environmental enclosure for automotive vehicle(s), rider(s), passenger(s), and loads is equipped with airbag systems which provide greatly increased safety and protection of the automotive vehicle(s), rider(s), passenger (s), and load(s) in collisions and accidents. The enclosure is equipped with temperature and environmental control systems which provide protection against and comfort in undesirable, uncomfortable, or extreme weather conditions including (but not limited to) extreme cold, heat, sunshine, or poor air quality. The enclosure is equipped with or made of material which allows or deters varying forms of light or energy in or out of or through the enclosure. The enclosure may also be made of non-shattering material (i.e. for protection and safety in cases of collisions and accidents and objects striking the enclosure). The enclosure also includes different types of communication systems made on or about the enclosure including (but not limited to) sight, sound, and 'physical sensation' related communication systems or devices. The enclosure provides the rider(s) and/or passenger(s) with varying degrees of "luxury and comfort".

6 Claims, 5 Drawing Sheets

FFE FOR THREE - AND FOUR - WHEEL AUTOMOTIVE VEHICLES

FFE FOR THREE - AND FOUR - WHEEL AUTOMOTIVE VEHICLES

FAIRING AND FAIRINGLESS ENCLOSURES FOR TWO-, THREE-, AND FOUR-WHEEL AUTOMOTIVE VEHICLES/RIDERS/PASSENGERS/LOADS (FFE)

CROSS-REFERENCES TO RELATED APPLICATIONS

1. Kelley, R. F., 1976. "Transparent Cover with Connecting Devices for Motorcycles and Riders".
2. Bothwell et al., 1997. "Motorcycle with an Enclosed Body and Support Assembly".
3. Bunau-Varilla, E., 1915. "Wind Dividing Apparatus for Transport Vehicles with Kinematics Equilibrium".
4. Stobar, L. T., 1978. "Motorcycle Fairing-Windshield Assembly".
5. Johnson, et al., 1982. "Motorcycle Fairing Body Extender".
6. Yoshimura et al., 1994. "Fairing for a Motorcycle".
7. Buell, E., 1990. "Motorcycle Fairing".
8. Yamada et al., 1990. "Exterior Shell of a Motorcycle Front Fairing Unit".
9. Jaeke, V., 1977. "Motorcycle Fairing".
10. Hickman, J. S., 1982. "Motorcycle Fairing".
11. Sakuma, T. S., 1998. "Motorcycle with Fairing".

BACKGROUND OF THE INVENTION

1. Field of the Invention/Technical Field

The following is 'A statement of the field of art to which the invention pertains':
1. U.S. Class 180 Field of Search: 180/219; 180/271-180/290; 180/281; 180/274
2. U.S. Class 296 Field of Search: 296/78.1; 296/84.1; 296/211; 296/188; 296/200; 296/201; 296/35.1
3. U.S. Class 280 Field of Search: 280/728.1

2. Description of Related Art

Numerous patents and other proposals describe enclosures, covers, and apparati for motorcycles or two-wheeled, automotive vehicles (Bothwell et al., 1997; Kelley, 1976, and Bunau-Varilla, 1915). These patented enclosures, covers, and apparati (i.e. the enclosure, cover, or apparati themselves as opposed to the vehicle or direct attachments/connections to the vehicle) provide protection of the rider from wind, rain, and to some degree, weather conditions and accidents. The enclosures, covers, and apparati (i.e. the enclosure, cover, or apparati themselves as opposed to the vehicle or direct attachments or connections to the vehicle) provide specific protection from accidents or collisions with mechanisms including a) "honeycomb, foam, or other energy absorbing means" for protection of the leg and foot portion of the rider on the footrest and within the support member and b) being "of relatively thick impact absorbing material and/or construction" (Bothwell et al., 1997). Kelley (1976) also describes the cosmetic protection, one hundred percent transparency, and the material (manufacturing of the material) of which the motorcycle cover is made. The general longitudinal, vertical, and horizontal dimension of these patented enclosures, covers, and apparati (Bothwell et al., 1997, Kelley, 1976; and Bunau-Varilla, 1915) are also described as are the transparent nature (Kelley, 1976) and the (single) attachment of the enclosure, cover, or apparati to the vehicle {i.e. to the two-wheeled vehicle/motorcycle/bicycle (Bothwell et al., 1997; Kelley, 1976; and Bunau-Varilla, 1915)}. Bothwell et al. (1997) describes support members for the enclosed motorcycle and the patents describe openings within or about the enclosure, cover, or apparati for rider entry and tire contact with the riding surface. The above described enclosures, covers, and apparati generally allow transparent type visibility into and out of the enclosures, covers, and apparati.

The patented enclosures, covers, and apparati (i.e. the enclosure, cover, or apparati themselves as opposed to the vehicle or direct attachments or connections to the vehicle) described above do not provide a high degree of protection for the riders, passengers, and loads from collisions and accidents. The protection of the rider in collisions or accidents described by the above mentioned patents include protection and safety only to the degree to which the enclosures, covers, and apparati (i.e. the enclosure, cover or apparati themselves as opposed to the vehicle or direct attachments or connections to the vehicle) withstand impact with object(s) or to the degree to which the rider impacts the enclosure. The prior statement takes into consideration the 'safety strap/harness' described by Bothwell et al. (1997) which is attached to the motorcycle/automotive vehicle as opposed to the present invention. The patented enclosures, covers, and apparati (i.e. the enclosure, cover or apparati themselves as opposed to the vehicle or direct attachments or connections to the vehicle) described above do not provide a high degree of protection of the riders, passengers, and loads from more extreme weather and environmental conditions including (but not limited to) extreme or undesirable cold or hot weather, poor (or worse . . .) air quality, and extreme or undesirable rays from the sun and other light. The patented enclosures, covers, and apparati (i.e. the enclosure, cover, or apparati itself as opposed to the vehicle or direct attachments or connections to the vehicle) described above do not provide a high degree of variability regarding visibility into or out of the enclosures, covers, and apparati. The above described patents also do not provide for 'comfort and luxury' and for communications systems made, constructed, or designed within or about the enclosures, covers, and apparati.

To overcome these shortcomings, the present invention provides significant improvement of the safety and bodily protection of the rider (and passenger) in collision or accident situations compared to the patented enclosures, covers, and apparati described above by providing airbags on, within, or about the present invention. The present invention provides temperature and environmental control or regulating systems on, within, or about the enclosure to protect against more extreme weather conditions or less than desirable environmental conditions including (but not limited to) extreme or undesirable cold and heat and poor air quality. The present invention provides more varied degrees of visibility into and out of the enclosures, covers, and apparati compared to the present patented enclosures, covers, and apparati described above by providing an enclosure made of material {or including material(s)} that provides varying degrees of 'more than one way', 'visibility other than transparent', and transparent types of visibility into or out of the invention. The airbag devices made, constructed, or designed on or about the present invention may be made, constructed, or designed on or about the present invention as to not impede the vision of the riders or passengers. The present invention also provides for increased and varying degrees of 'luxury and comfort' for the rider(s), passenger (s), and loads by providing luxuries and comfort features such as (but not limited to) holders for personal items, easeful and lavish drivability and seating, communications systems, and audioaudiovisual systems.

BRIEF SUMMARY OF INVENTION

It is the object of the invention to a) provide enhanced lifesaving and injury reducing features and enhanced safety and protection of the rider(s) or passenger(s) or load(s) or vehicle(s) in accident, collision, or other impact situations (as compared to prior art) in the form of airbags distributed about an enclosure for automotive vehicles b) provide enhanced protection and comfort against adverse/undesired weather and environmental conditions including (and not limited to) extreme cold, extreme heat, extreme sunshine, and poor air quality as compared to prior art, c) provide varying degrees of visibility from outside and inside the vehicle (as compared to prior art), d) provide privacy within the enclosure (compared to prior art), e) provide enhanced comfort or luxury within the enclosure (as compared to prior art), f) provide wire and wireless sound, visual, and communication systems on or about the enclosure, and g) provide lights and mirrors about the enclosure.

BRIEF DESCRIPTION OF SEVERAL VIEWS OF THE DRAWINGS

The present invention will be more fully understood by references to the following brief description thereof when read in conjunction with the attached drawings, and wherein.

DETAILED DESCRIPTION OF THE INVENTION (References are to Illustrations)

The present invention consists of an 'airbag and environmental enclosure' for automotive vehicles that a) is equipped with at least one air bag or air bag strips located in different positions (including but not limited to horizontally and vertically) on, within, about, or attached to the 'airbag and environmental enclosure' (see FIGS. 1 through 8), b) is made, drawn, or designed with varying degrees of visibility into and out of the 'airbag and environmental enclosure', c) is made, drawn, or designed with environmental and temperature control systems or devices which protect the rider, or passenger(s), or load(s) from undesirable environmental conditions such as (but not limited to) extreme cold and heat, sunshine, or air quality, d) is made, drawn, or designed with 'comfort and luxury' features including (but not limited to) arm rests, lighting within and about the enclosure, personal and consumable material(s) holders, as well as sound, electronic, wire or wireless, or audio/audiovisual systems within, in, around, or about the 'airbag and environmental enclosure'.

Considering collisions, accidents, and other such situations, the present invention will provide much increased protection of the rider(s) or passenger(s) or load(s) or the vehicle(s) by being made, drawn, or designed with airbag systems which open or are activated upon the 'airbag and environmental enclosure' coming in contact with stationary or non stationary or other objects or elements. The present invention also provides protection of the rider(s) or passenger(s) or loads from moving or non moving vehicle parts in case of collisions, accidents, or other such occurrences. The 'airbag and environmental enclosure' will be made, drawn, or designed with 'extreme temperature' control devices or equipment which may be manually or automatically operated in order to maintain a desirable temperature within the 'airbag and environmental enclosure'.

The 'airbag and environmental enclosure' is made, constructed, drawn, or designed with non shattering or less shattering material which contributes to the much improved degree of safety and protection of the rider(s), passenger(s), load(s), or the vehicle(s) in situations involving collisions and accidents and other such occurrences. The 'airbag and environmental enclosure' is also made, constructed, drawn, or designed with light fixtures, mirrors, and other communication(s) devices or equipment on or about the enclosure.

The present invention is used in conjunction with, as a part of, or attached to automotive vehicles including motorcycles and does not obstruct or grossly hinder the performance or operation of the vehicles.

DETAILED DESCRIPTION OF THE DRAWINGS

Figure 1:
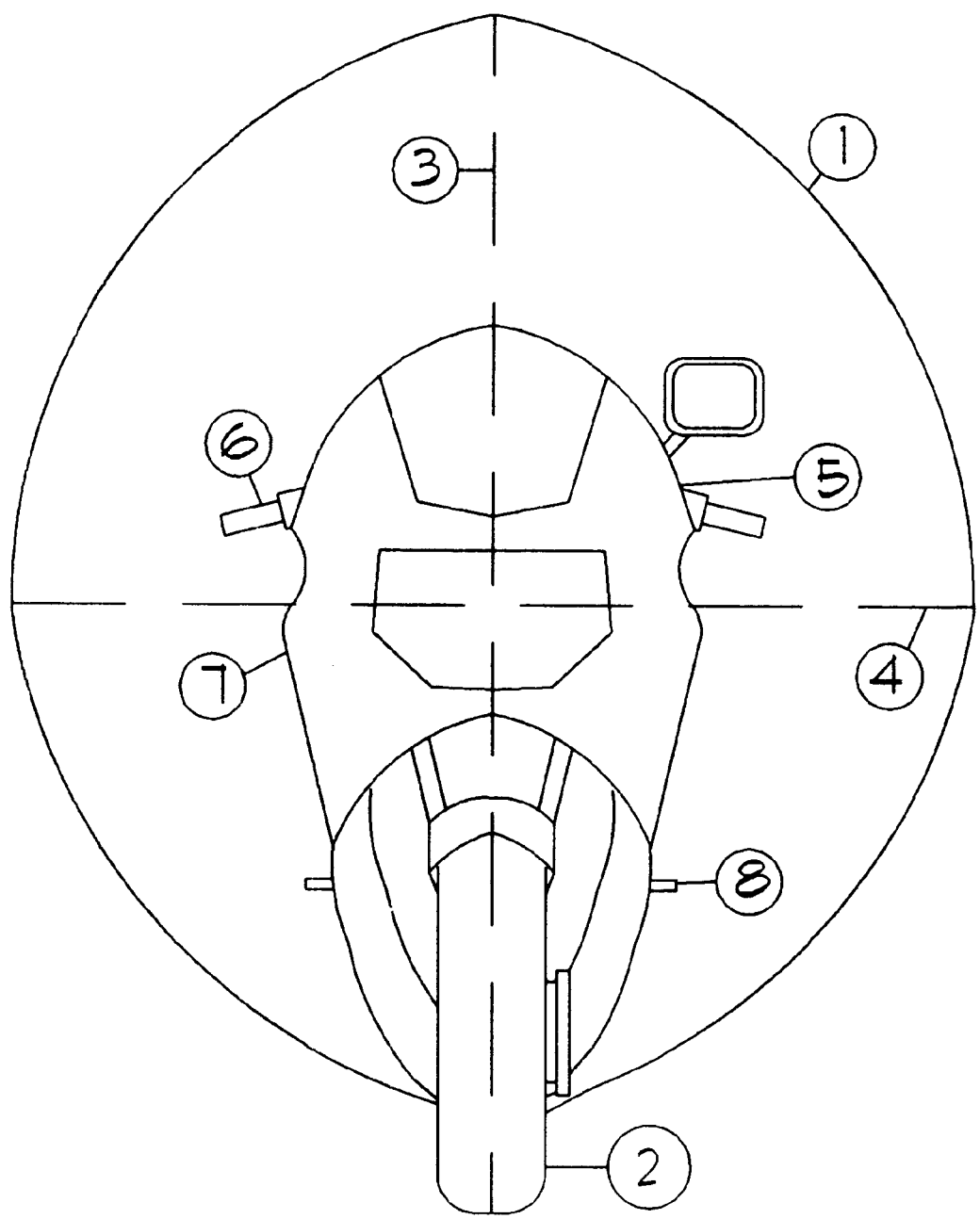
FIG. 1. Front cross-sectional view of a spheroidal shaped AEEAV enclosing a two-wheel automotive vehicle (motorcycle).

As illustrated in FIG. 1, which shows the front view of a two-wheel automotive vehicle (motorcycle) and depicts the vehicle's front tire 2, the handle bar 5, the brake and gas input/accelerator control 6, the fairing 7, and the foot rest 8, and also shows the front cross-sectional view of a spheroidal shaped AEEAV casing/shell showing the AEEAV 1, surrounding the two-wheel automotive vehicle with the laterally/longitudinally positioned air-bag systems 4, on or about the AEEAV shell/casing extending from the front midpoint of the AEEAV shell/casing rearward on or about the AEEAV casing/shell to the center of the back of the AEEAV shell/casing 1 and the vertically positioned air-bag systems 3, on or about the AEEAV shell/casing extending from the front midpoint of the AEEAV rearward on or about the AEEAV casing/shell to the center of the back of the AEEAV shell/casing 1. The air-bag systems associated with the AEEAV may be a single system providing varying degrees of safety for the rider, passenger, or vehicle and load or multiple systems providing the same. The nature, style, extent, shape, and positioning of the air-bag systems vary and are dependent upon the style, design, and type of AEEAV in question.

The AEEAV in FIG. 1, is a one- or two-way see-through, non-shattering, high safety exhibiting, varying shaped, clear or tinted enclosure built or attached to or around or in some instances with or about the automotive vehicle of concern. The thickness of the AEEAV casing/shell is dependent on the style and type of AEEAV of concern as well as on the degree of safety, comforts, accessories, equipment, and all other components of concern on, within, along, or about the AEEAV of concern. The degree of safety, comforts, accessories, equipment, and all other components of concern within, along, or about the AEEAV of concern include but are not limited to sun/moon roofs, luxuries, visors, communications systems and components, audio systems and components, cooling/heating systems and components, mirrors, and openings, windows, and doors.

An opening in the bottom of the AEEAV in FIG. 1, allows for automotive vehicle tire projection outside the AEEAV and contact with the surface upon which the vehicle is moving and vehicle turning and maneuvering as well as additional air circulation within or about the AEEAV. Depending on the style, type, and design of the AEEAV, opening(s) may not be necessary for the vehicle wheel/tire projection and contact with the surface upon which the vehicle is moving. The opening in the bottom of the AEEAV may be designed for single or multiple tire projection and vehicle maneuvering through a single or multiple openings in the bottom or lower portion of the AEEAV.

Entrance or exit door(s) or access(es) will be positioned or about the AEEAV for rider or passenger (or any other type of entrance or exit into or from the AEEAV) and will be positioned and described based upon the style, type, and design of the AEEAV of concern.

All features, descriptions, and components of the AEEAV described for any particular automotive vehicle(s) are also associated with other automotive vehicles.

Figure 2:
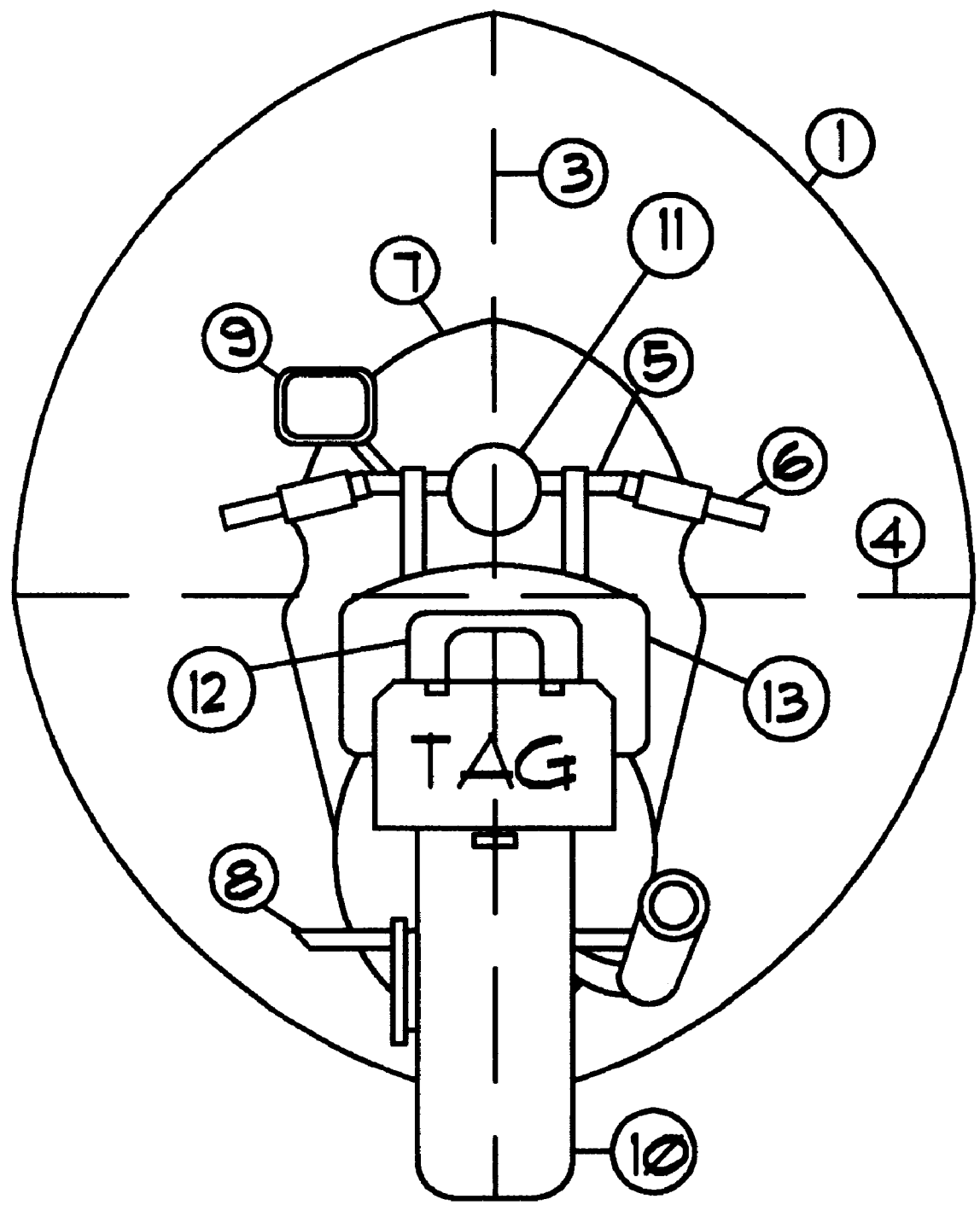
FIG. 2. Back cross-sectional view of a spheroidal shaped AEEAV enclosing a two-wheel automotive vehicle (motorcycle).

Illustrated in FIG. 2 is the back view of a two-wheel automotive vehicle (motorcycle) which depicts the vehicle's back tire 10, the handle bar 5, the hand brake and gas input/accelerator control 6, the fairing 7, and the foot rest 8, and also shows the back cross-sectional view of a spheroidal shaped AEEAV showing the AEEAV 1, surrounding the two-wheel automotive vehicle with the laterally and longitudinally positioned air-bag systems 4, on or about the AEEAV shell/casing extending from the front midpoint of the AEEAV shell/casing rearward on or about the AEEAV casing/shell to the center of the back of the AEEAV shell/casing 1, and the vertically positioned air-bag systems 3, on or about the FFE shell/casing extending from the front midpoint of the AEEAV rearward along/within the AEEAV casing/shell to the center of the back of the AEEAV shell/casing 1. Also shown in FIG. 2 are the vehicle mounted rear view mirrors 9 (which may also be placed on, about, or associated with the AEEAV casing/shell), the vehicle mounted console 11, the back of the passenger/rider seat 12, and the vehicle gas tank 13. Any vehicle mounted/attached components may be mounted/attached in conjunction with the AEEAV and vice versa.

Figure 3:
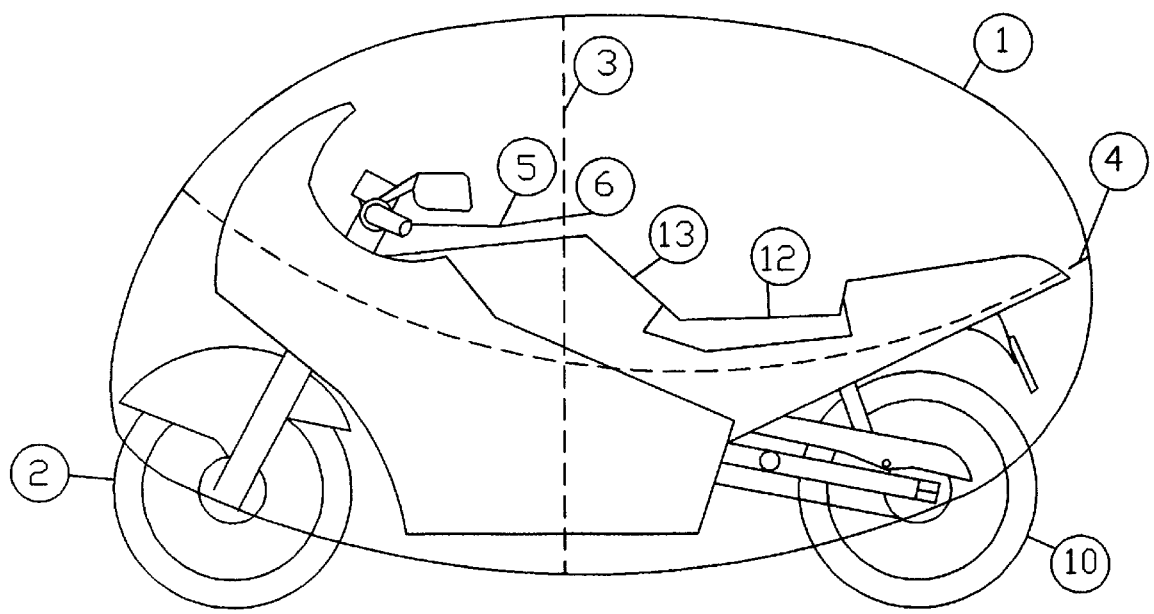
FIG. 3. Side cross-sectional view of a spheroidal shaped AEEAV enclosing a two-wheel automotive vehicle (motorcycle).

FIG. 3 shows the side view of a two-wheel automotive vehicle (motorcycle) and depicts the vehicle's front tire 2, rear tire 10, handle bar 5, hand brake and gas input/accelerator 6, seat 12, gas tank 13, and also shows the side cross-sectional view of a spheroidal shaped AEEAV with laterally and longitudinally positioned 4 (which extends from the front to the rear of the AEEAV 1 along or about the AEEAV casing/shell) and vertically positioned 3 (which extends from the top to the bottom of the AEEAV 1 along or about the AEEAV casing/shell) air bag systems which are positioned on, within, along, or about the AEEAV casing/shell.

Figure 4:
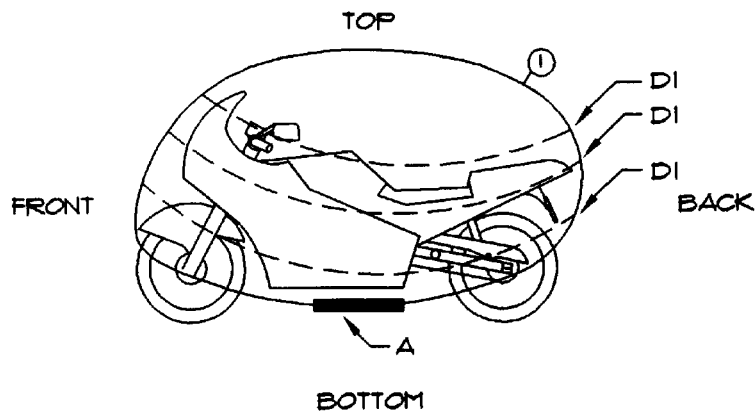
FIG. 4. Side cross-sectional view of a spheroidal shaped AEEAV with horizontally positioned air-bag systems enclosing a two-wheel automotive vehicle (motorcycle).
Figure 5:
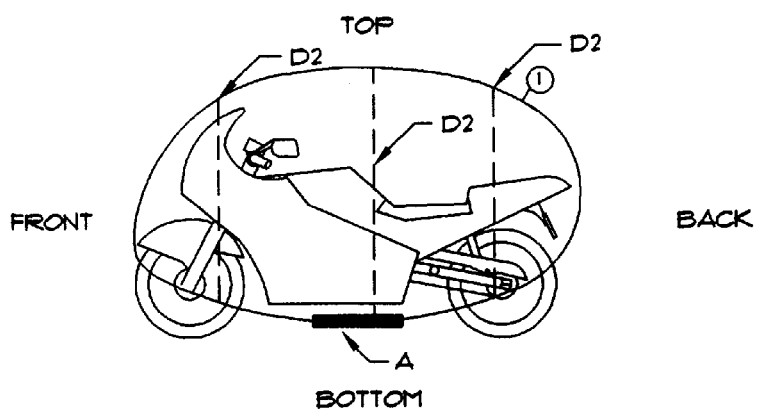
FIG. 5. Side cross-sectional view of a spheroidal shaped AEEAV with vertically positioned air-bag systems enclosing a two-wheel automotive vehicle (motorcycle).

FIG. 4 shows the side cross-sectional view of a spheroidal shaped AEEAV 1, enclosing a two-wheel automotive vehicle and depicts the entrance step or footstep A, and laterally and longitudinally positioned air-bag systems D1 placed in multiple positions along, within, or about the AEEAV. FIG. 5 shows the side cross-sectional view of a spheroidal shaped AEEAV 1, enclosing a two-wheel automotive vehicle and depicts the entrance step or footstep A, and vertically positioned air-bag systems D2 placed in multiple positions on, along, within, or about the AEEAV.

Figure 6:
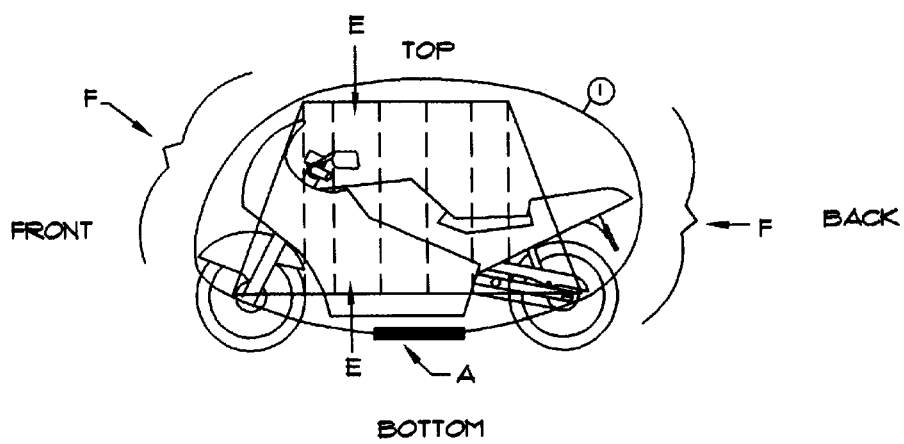
FIG. 6. Side cross-sectional view of a spheroidal shaped AEEAV with feature(s) and light fixture(s) positions enclosing a two-wheel automotive vehicle (motorcycle).

FIG. 6 shows the side cross-sectional view of a spheroidal shaped AEEAV 1 enclosing a two-wheel automotive vehicle and depicts one of the general areas E where the cooling/heating, audio, communication, luxuries, and other accessories and components of the AEEAV 1 will be positioned. FIG. 6 also depicts the entrance step/foot rest A, the general position of the exhaust openings F which may be positioned in various positions about the AEEAV 1 and the general positioning of the light fixtures F which will vary with AEEAV style, type, and design.

Figure 7:
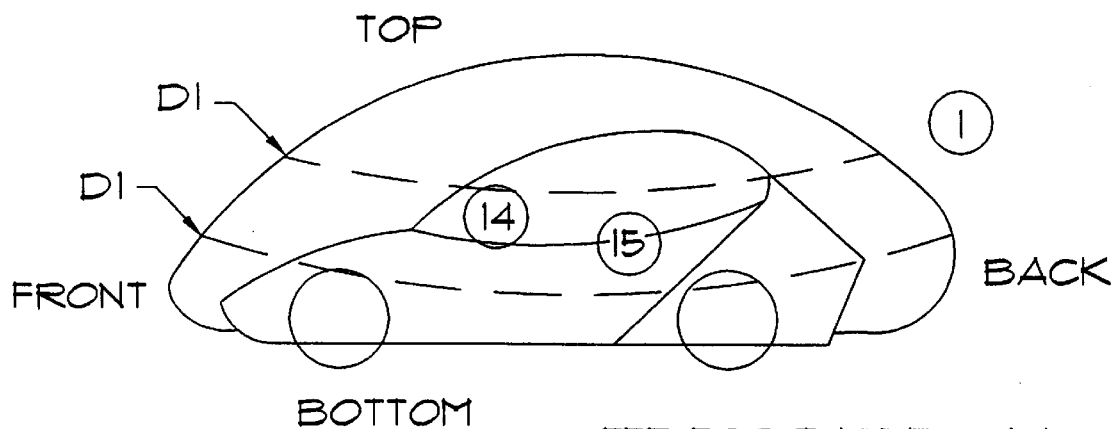
FIG. 7. Side cross-sectional view of a spheroidal shaped AEEAV with horizontal positioned air-bag systems enclosing a three-(tri-cycle) or four-wheel automotive vehicle.
Figure 8:
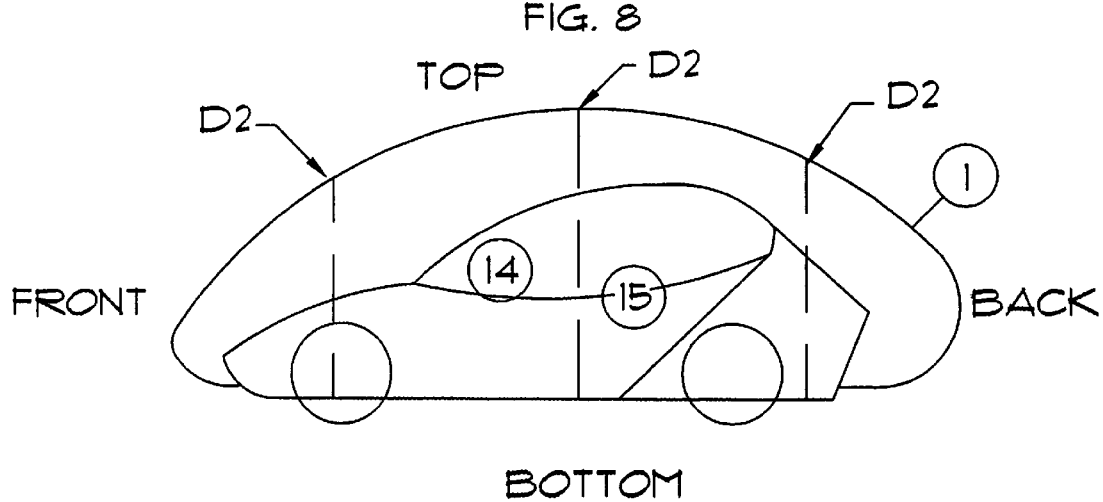
FIG. 8. Side cross-sectional view of a spheroidal shaped AEEAV with vertically positioned air-bag systems enclosing a three-(tri-cycle) or four-wheel automotive vehicle (motorcycle).

FIG. 7 shows the side cross-sectional view of a spheroidal shaped AEEAV 1 enclosing a three- or four-wheel automotive vehicle depicting the laterally and longitudinally positioned air-bag systems D1, the vehicle steering wheel 14, and the driver/passenger seat 15. FIG. 8 shows the side cross-sectional view of a spheroidal shaped AEEAV 1 enclosing a three- or four-wheel automotive depicting the vertically positioned air-bag systems D2, the vehicle steering wheel 14, and the driver/passenger seat 15.

The general dimensions of the AEEAV are described below. The thickness of the AEEAV casing/shell ranges from less than one micrometer to fifty feet. Initially and generally, the thickness of the AEEAV casing/shell will range from 0.5 inches to 1.5 inches. The left to right width of the AEEAV (viewing from the top or side) will vary with design, style, and type and will take into consideration the width of the automotive vehicles and the rider/passenger as well as the degree of safety, luxury, accessories, and all other components, parts, and additions or modifications of the AEEAV or any components. The determination of the width of the AEEAV will consider the width of the automotive vehicles, frame/body, steering devices, tire(s) description, engine(s) description, and all other components of the automotive vehicle. The general widths of the AEEAV will range from approximately six inches to fifteen feet. Initially, the width of the enclosure will be approximately six feet. This width includes the inner and outer widths of the AEEAV and considers the thickness of the AEEAV which will vary depending on the style, type, and design of the AEEAV. The front to back length of the AEEAV (viewing from the top or side) will vary with design, style, and type and will take into consideration the length of the automotive vehicles and the driver/passengers as well as the degree of safety, luxury, accessories, and all other components, parts, and additions or modifications of the AEEAV or any components. The determination of the length of the AEEAV will consider the length of the automotive vehicles, frame/body, steering devices, tire(s) description, engine(s) description, and all other components of the automotive vehicle. The general lengths of the AEEAV will range from approximately one foot to fifty feet. The initially length of the enclosure will be eight to ten feet. This length includes the inner and outer widths and considers the thickness of the AEEAV which will vary depending on the style, type, and design of the AEEAV. The top to bottom height of the AEEAV (viewing from the front, back, or side) will vary with design, style, and type and will take into consideration the height of the automotive vehicles and the driver/passengers as well as the degree of safety, luxury, accessories, and all other components, parts, and additions or modifications of the AEEAV or any components. The determination of the height of the AEEAV will consider the height of the automotive vehicles, frame/body, steering devices, tire(s) description, engine(s) description, and all other components of the automotive vehicle. The general height of the AEEAV will range from approximately six inches to fifteen feet. The initial height of the enclosure will be approximately six to seven feet. This height includes the inner and outer widths of the AEEAV and considers the thickness of the AEEAV which will vary depending on the style, type, and design of the AEEAV.

I claim:

1. A vehicle protective system comprising:
    a substantially transparent enclosure for enclosing and protecting the majority of said vehicle, wherein substantially all of said enclosure is spaced from an exterior of said vehicle;
    an airbag system mounted on said enclosure for protecting said vehicle and a person or persons riding on said vehicle.

2. The vehicle protective system of claim 1, wherein the airbag system is located so as to minimize the obstruction of visibility of the person or persons riding on said vehicle.

3. The vehicle protective system of claim 2, wherein said substantially transparent enclosure is tinted.

4. The vehicle protective system of claim 2, wherein at least a portion of said airbag system is distributed around the intersection of a horizontal plane with said enclosure.

5. The vehicle protective system of claim 2, wherein at least a portion of said airbag system is distributed around the intersection of a vertical plane with said enclosure.

6. The vehicle protective system of claim 2, wherein said substantially transparent enclosure is made of a shatter-resistant material.

* * * * *